United States Patent
Banerjee et al.

(10) Patent No.: US 7,308,006 B1
(45) Date of Patent: Dec. 11, 2007

(54) PROPAGATION AND DETECTION OF FAULTS IN A MULTIPLEXED COMMUNICATION SYSTEM

(75) Inventors: Dhritiman Banerjee, Lakewood, NJ (US); Giorgio Giaretta, Westfield, NJ (US); Anthony Lodovico Lentine, St. Charles, IL (US); Ted Kirk Woodward, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/502,882

(22) Filed: Feb. 11, 2000

(51) Int. Cl.
*H04J 3/04* (2006.01)

(52) U.S. Cl. .................. 370/535; 370/536; 370/537; 370/542

(58) Field of Classification Search .............. 370/242, 370/244, 366, 395.53; 359/226, 227, 228, 359/114, 115; 714/48–57, 2–14, 25
See application file for complete search history.

(56) References Cited

U.S. PATENT DOCUMENTS

| | | | | |
|---|---|---|---|---|
| 5,040,170 | A | * | 8/1991 | Upp et al. |
| 5,982,309 | A | * | 11/1999 | Xi et al. |
| 6,014,237 | A | * | 1/2000 | Abeles et al. |
| 6,044,087 | A | * | 3/2000 | Muller et al. |
| 6,151,336 | A | * | 11/2000 | Cheng et al. |
| 6,298,038 | B1 | * | 10/2001 | Martin et al. ............... 370/216 |
| 6,308,231 | B1 | * | 10/2001 | Galecki et al. ............... 710/72 |
| 6,388,782 | B1 | * | 5/2002 | Stephens et al. |
| 6,535,313 | B1 | * | 3/2003 | Fatehi et al. |

* cited by examiner

*Primary Examiner*—Chi Pham
*Assistant Examiner*—Thai Hoang

(57) ABSTRACT

A data transmission system that detects fiber faults receives a plurality of data packets carried on a plurality of Gigabit Ethernet links at a plurality of Gigabit Ethernet input/output ports. The system then multiplexes, on a bit by bit basis, the data packets onto an optical link. When the system detects a loss of signal in one of the Gigabit Ethernet links, a signal loss code insert is generated. The system then multiplexes the signal loss code insert with the data packets.

2 Claims, 5 Drawing Sheets

PROPAGATION AND DETECTION OF FAULTS IN A MULTIPLEXED COMMUNICATION SYSTEM

CROSS-REFERENCES TO RELATED APPLICATIONS

This application claims the benefit of U.S. Pat. No. 6,690,682 filed Mar. 12, 1999, entitled "Bit Multiplexing of Packet-Based Channels" and U.S. Pat. No. 6,771,671, filed Nov. 22, 1999, entitled "DATA FLOW SYNCHRONIZATION AND ORDERING".

FIELD OF THE INVENTION

The present invention is directed to digital communications. More particularly, the present invention is directed to propagation and detection of faults in a digital communication system.

BACKGROUND OF THE INVENTION

As the volume of digital data sent over communication lines rapidly grows, there is continuous need for high bandwidth communication links. One specific need is for 10 Gb/s capacity links for enterprise networks to transmit packet-based data such as Ethernet data. However, there is not a generally available data link supporting Ethernet packet transmission at 10 Gb/s data rates because there are no enterprise switching and routing products that can support 10 Gb/s Ethernet interfaces at this time.

Presently, statistical multiplexing on a packet-by-packet basis multiplexes lower-rate channels in a local area network ("LAN") environment. For example, in LAN switches, Ethernet frames are multiplexed onto a higher-speed port frame-by-frame. Although the framing structure is usually preserved, Ethernet frames of different rate (e.g., 10/100/1000 Mb/s) have different encoding standards, requiring decoding and coding before and after multiplexing.

Other multiplexing techniques are possible that do not require a new standard because they involve combining or "trunking" of multiple links to a link of higher aggregate capacity. One example is "Etherchannel" that uses multiple pairs of wires or fibers that behave like a single data link of higher capacity. A different multiplexing scheme that is more efficient in its use of wiring is the wavelength-division-multiplexing ("WDM") of individual data links onto a single optical fiber using different wavelengths. Similarly, time-division-multiplexing ("TDM") is currently only used when many lower-speed (e.g., 10BASE-T) signals need to be sent over longer distances over a single fiber connection.

The aforementioned multiplexing techniques have significant disadvantages. Specifically, statistical packet multiplexing requires a definition of a new physical (i.e., the PHY-layer) and data-link (i.e., the MAC-layer) standard every time a LAN standard of higher speed is required. This standardization process can take years. It also requires buffers at least a few packets deep. Channel trunking or link aggregation is very wasteful with respect to wiring. WDM multiplexing is expensive over distances that do not require optical amplifiers because of the high cost of WDM optical components.

Based on the foregoing, there is a need for an improved method and system for high-speed transmission of data by multiplexing packet-based communication links.

SUMMARY OF THE INVENTION

One embodiment of the present invention is a data transmission system that detects fiber faults. The system receives a plurality of data packets carried on a plurality of Gigabit Ethernet links at a plurality of Gigabit Ethernet input/output ports. The system then multiplexes the data packets onto an optical link. In an exemplary embodiment of the present invention, the multiplexing may be performed on a bit by bit basis. When the system detects a loss of signal in one of the Gigabit Ethernet links, a signal loss code insert is generated. The system then multiplexes the signal loss code insert with the data packets.

DETAILED DESCRIPTION

One embodiment of the present invention is a fiber-optic system that uses time-division-multiplexing to multiplex standardized link protocols such as Gigabit Ethernet to higher rates. This is a lower-cost solution over known prior art techniques of multiplexing digital data because it is makes optimum use of speed advances in silicon circuits. For example, compared to other trunking approaches like WDM or parallel fiber ribbons, it requires the lowest-cost optical transceivers as well as the least amount of optical fiber.

Further cost reductions can be achieved by integrating the multiplexing functions into the line card of a Gigabit Ethernet switch. That way, the multiple fiber-optic Gigabit Ethernet links can be entirely eliminated and replaced by a single high-speed fiber-optic link. Since the cost scales sublinearly with the line rate at that speed range, this approach realizes substantial cost savings.

TDM multiplexing of standardized link protocols such as Gigabit Ethernet to higher data rates avoids the problems with known multiplexing techniques, without the need to create a new data link protocol at the multiplexed data rate. The multiplexing is transparent to the input and output ports and uses standardized interfaces. That allows the use of the multiplexer either to aggregate multiple independent Gigabit Ethernet channels, or to make the link appear as a single data link of higher capacity using standardized link aggregation (trunking) protocols. TDM is the least expensive multiplexing technology as long as the multiplexed data rate can be implemented in silicon technology. Currently this is the case up to a line rate of 10 Gb/s, and at higher line rates in the future. This approach therefore leads to economical 10 Gb/s enterprise network implementations far in advance of a creation of a 10 Gb/s LAN standard.

Figure 1:
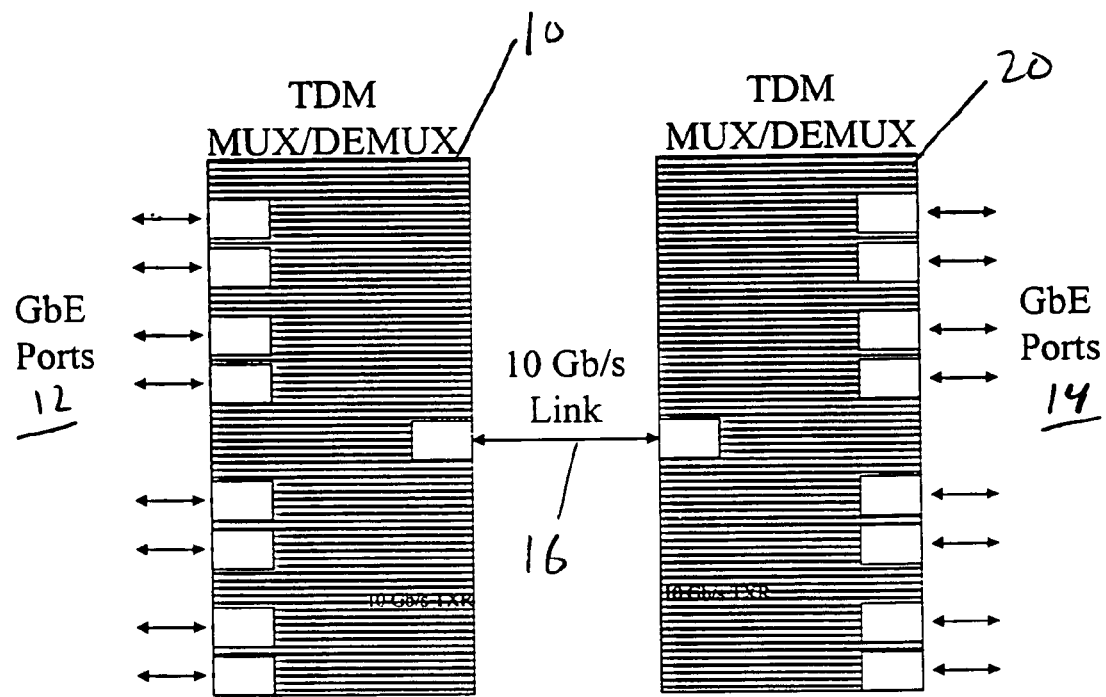
FIG. 1 is a block diagram of a high speed multiplexing system in accordance with one embodiment of the present invention.

FIG. 1 is a block diagram of a high speed multiplexing system in accordance with one embodiment of the present invention. The system includes a pair of TDM multiplexer/demultiplexer units 10 and 20. Coupled to unit 10 are Gigabit Ethernet input/output ports 12. Input/output ports 12 are each coupled to a Gigabit Ethernet communication link (not shown). The Gigabit Ethernet communication link transports packetized digital data at a serial line rate of 1.25 Gb/s. Each packet is variable length in accordance with the IEEE 802.3 frame format. In addition, the data is 8b/10b coded. Similarly, Gigabit Ethernet input/output ports 14 and corresponding Gigabit Ethernet communication links are coupled to multiplexer/demultiplexer unit 20. A single high-speed fiber-optic link 16 having a line rate of approximately 10 Gb/s is coupled between units 10 and 20.

In general, multiplexer unit 10 bit multiplexes, on a bit by bit basis, multiple Gigabit Ethernet ports 12 from the same or different Gigabit Ethernet switches onto high-speed fiber-optic link 16 with a line rate on the order of 10 Gb/s. The data is then output from demultiplexer unit 20. The process also works in reverse (i.e., input at multiplexer unit 20, output at demultiplexer unit 10). Interfaces to multiplexer/demultiplexer units 10 and 20 are fully compliant with the Gigabit Ethernet standard, so that multiplexer/demultiplexer units 10 and 20 are transparent to individual Gigabit Ethernet links.

Figure 2:
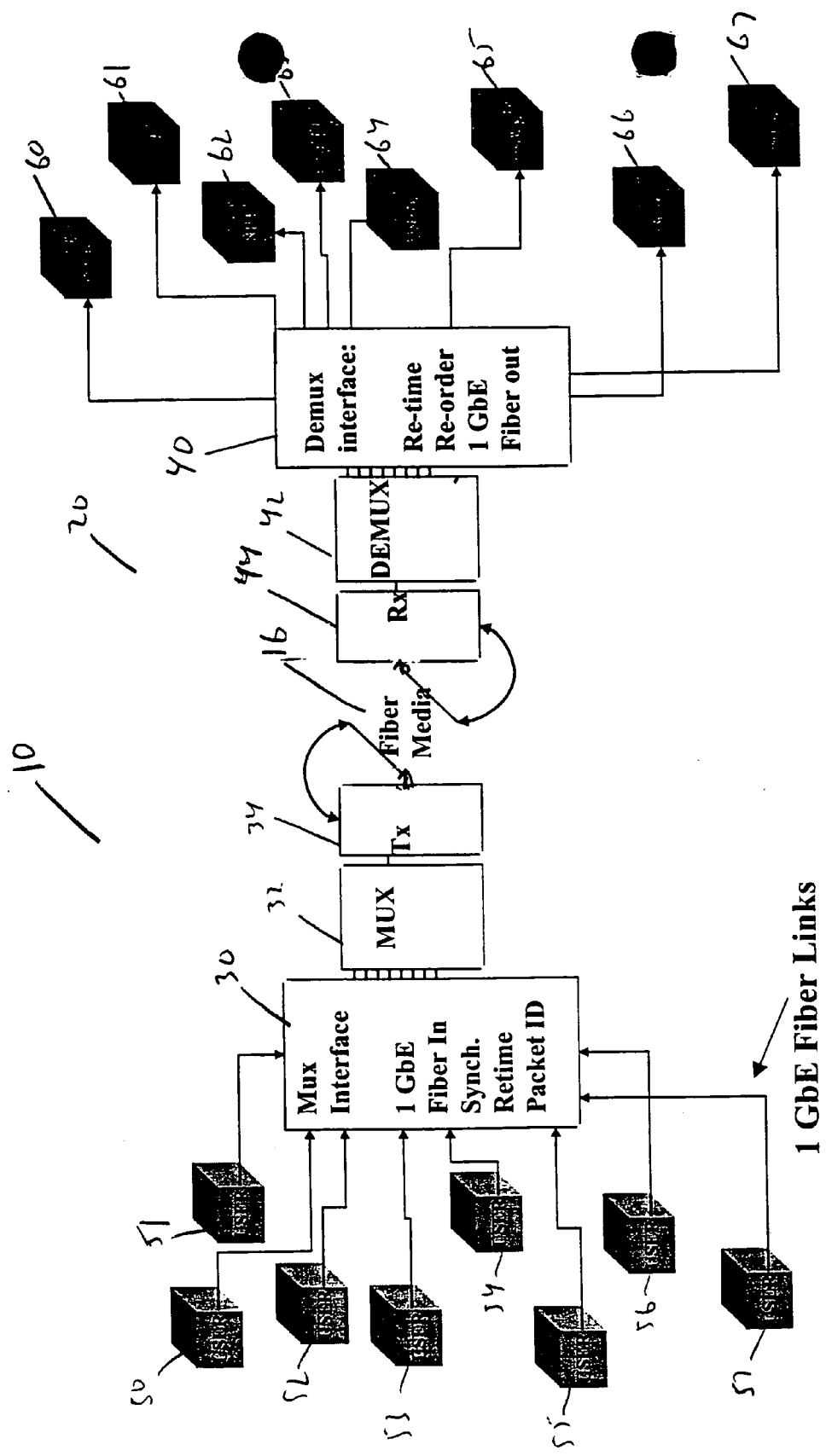
FIG. 2 is a more detailed block diagram of the high speed multiplexing system in accordance with one embodiment of the present invention.

FIG. 2 is a more detailed block diagram of the high speed multiplexing system in accordance with one embodiment of the present invention. As shown in FIG. 2, multiplexer/demultiplexer unit 10, on its multiplexer side, includes a multiplexer ("MUX") interface 30, a MUX 32, and a fiber optic transmitter 34. Users 50-57 are coupled to MUX interface 30 via Gigabit Ethernet fiber links.

As further shown, multiplexer/demultiplexer unit 20, on its demultiplexer ("DEMUX") side, includes a fiber optic receiver 44, a DEMUX 42, and a DEMUX interface 40. Users 60-67 are coupled to DEMUX interface 40 via Gigabit Ethernet fiber links.

In one embodiment, MUX 32 is a standard 8:1 MUX that is commercially available from, for example, OKI Corporation. Similarly, in one embodiment DEMUX 42 is a standard 1:8 DEMUX that is also commercially available from, for example, OKI Corporation.

MUX interface 30 includes logic chips to align bits from the independent Ethernet inputs from users 50-57, and mechanisms to insert and extract characters without affecting the packet content to accommodate differences in the clock of the input signals. DEMUX interface 40 includes a mechanism for clock and data recovery of the received signal.

In another embodiment of the present invention, the multiplexing function of MUX 32 is integrated into the line card of a Gigabit Ethernet switch. Because the switch employs a common clock, no circuitry to accommodate clock skew is required. While this implementation is simpler and cheaper than the aforementioned stand-alone line multiplexer, it also results in a proprietary 10 Gb/s interface which can be a drawback.

However, even in this embodiment, it is possible to design line cards in such a way that the link can be established between equipment of different vendors. In one such implementation, the standard U9 connector to the fiber-optic transceivers can be used as the interface that is common to equipment of different vendors. For example, the multiplexing functions can be integrated on a mezzanine card that plugs directly into multiple U9 connectors on the line card.

Another cross-section within the line card that is well defined is the input to the SERDES (Serializer-Deserializer) chip, which has 10 lines at 125 Mb/s each. Yet another option to interface line cards of different vendors with the multiplexer is possible once the Gigabit Media-Independent Interface becomes established in the Gigabit Ethernet standards.

The system of FIG. 2 multiplexes independent bit streams in the time domain. This requires that the input streams (i.e., the Gigabit Ethernet link data packets) are synchronized to one another. Generally, these streams are at nominally the same data rate, but clock frequencies may differ from one another by a small amount that is typically measured in parts per million ("ppm"). For example, a 100 ppm variation between two signals ($1 \times 10^{-4}$) nominally clocked at 1 GHz will result in 100 bits of offset in one millisecond.

Further, when multiplexing is performed in a bit-wise fashion, the output bit streams are indistinguishable as far as the bit-wise demultiplexer is concerned. As a result, the data applied to port 'one' of the multiplexer may be output on any of the demultiplexer output ports. It is generally desirable to cause this bit stream to emerge from port 'one' of the demultiplexer. In general, it is necessary to know something about the bit streams to perform this function. In the parlance of the networking community, it is common to segment and reassemble the data streams at either the data link or networking layer of the network hierarchy. Such operations entail additional complexity and it may be desirable to perform such functions at the physical layer of the network to the greatest extent possible.

Figure 3:
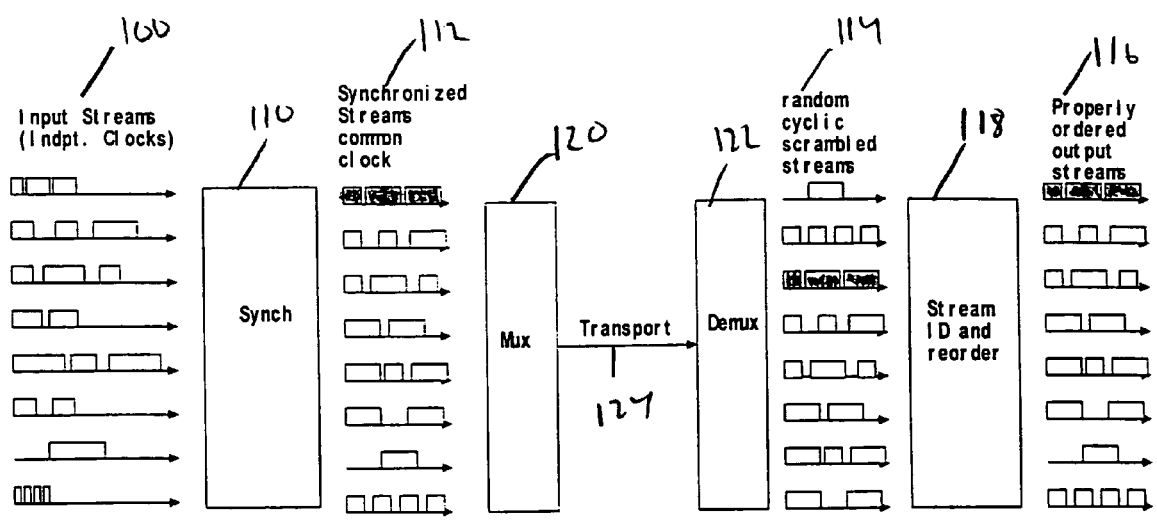
FIG. 3 illustrates a block diagram of a system in accordance with one embodiment of the present invention that overcomes various timing problems.

FIG. 3 illustrates a block diagram of a system in accordance with one embodiment of the present invention that overcomes the previously described problems. Data streams 100 having independent clocks enter a synchronizer 110. Synchronizer 110 is functionally equivalent to MUX interface 30 of FIG. 2. Synchronizer 110 outputs synchronized data streams 112 that have a common clock. Synchronized data streams 112 are multiplexed by a MUX 120, transported on a high speed fiber-optic transport link 124, and then demultiplexed by a DEMUX 122. DEMUX 122 outputs random cyclic scrambled data streams 114. A Stream ID and Reorder module 118 identifies and reorders the data streams in the proper order relative to how they were input at synchronizer 110, and outputs properly ordered data streams 116. The present invention incorporates various methods of implementing the clock synchronization, bit-stream identification, and ordering at the physical layer of the data link.

Signals propagating in communication networks are often specially encoded to provide some advantages to detection and transmission systems. It is also possible to encode data with redundant bits. Such codes are often described as Mb/Nb codes, where N>M represents the level of redundancy. For example, an 8b/10b code would transform 8 bits of information into 10 symbols, which convey only 8 bits of information. The coding overhead consists of 2 bits out of 8, or 25%. Such codes often are employed in data transmission systems such as Gigabit Ethernet systems.

Clock Synchronization

In one embodiment, the clock synchronization function is implemented by using a fast clock. Specifically, the transport clock in the system is the fastest clock in the system. This eliminates the need to drop bits in the link synchronization function. In this embodiment, it is necessary to add bits.

Such addition may be done in such a way that the added bits can be identified at the output of the link and removed after demultiplexing.

In another embodiment, the clock synchronization function is implemented by using packet start and stop identifiers. If the link contains packets of information with gaps in between the packets, the start and end of the packet can be identified and the dropping and adding of bits can be arranged to take place between the packets and not inside the packets. In this way, packet throughput is not unduly affected.

Bit Stream Identification

In one embodiment, the bit stream identification function is implemented by inserting distinguishing bit sequences between the packets that can be identified at the output of the demultiplexer in a packet-based link in which packet start and stop are identified. This can be done on all channels, or only on a single channel, since the bit streams will not be scrambled, but merely cyclically permuted between N possible states, where N is the level of demultiplexing.

In another embodiment, the bit stream identification function is implemented by superimposing special identifying information on the otherwise unmodified packets or data bits. This special identifying information can take the form of a RF carrier tone that is added to the data stream and then stripped off with RF filters at the output of the demultiplexer.

In still another embodiment, the bit stream identification function is implemented by employing a training in which only a single line of the link is activated until the appropriate link configuration is achieved.

Bit Stream Reordering

In one embodiment, the bit stream reordering function is implemented by causing a current output channel that is identified to appear on another output channel by routing the channels through a switch with N inputs and N outputs, where N is the number of bit streams.

In another embodiment, the bit stream reordering function is implemented by adjusting the multiplexer operating parameters until the identified channel appears on the desired output port of the demultiplexer. Methods for adjusting the multiplexer include, but are not limited to:

(1) adjusting the phase of the multiplexer clock relative to the individual input data streams;

(2) adjusting the delay of the individual input data streams relative to the multiplexer clock; and (3) starting and stopping the multiplexer clock until the proper data channel appears at the desired output port.

Figure 4:
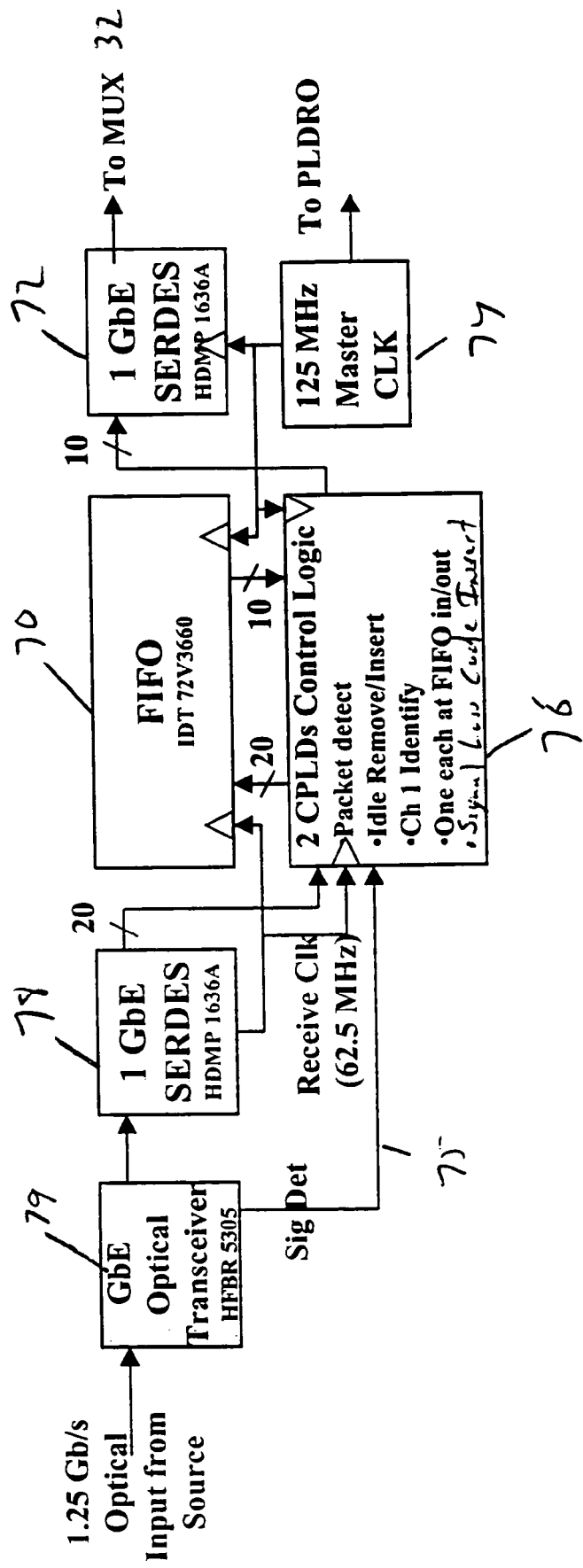
FIG. 4 is a detailed block diagram for one input line of the MUX interface of FIG. 2 and the Synchronizer of FIG. 3 in accordance with one embodiment of the present invention.

FIG. 4 is a detailed block diagram for one input line of MUX interface 30 of FIG. 2 and Synchronizer 110 of FIG. 3 in accordance with one embodiment of the present invention. In FIG. 4, an optical transceiver 79 receives the packetized data from its source at 1.25 Gb/S. The data is output to a serializer/deserializer 78 ("SERDES") which is used to deserialize and recover the clock.

A first-in-first-out buffer 70 ("FIFO") is employed to perform synchronization. Two complex programmable logic devices 76 ("CPLD"s) are used to both examine data prior to its entry into FIFO 70 and to examine data upon its exit from FIFO 70. FIFO 70 runs at two clock frequencies, one for input and one for output. When multiple input channels are fed into multiple FIFOs (not shown in FIG. 4), each input is clocked at the rate of the individual input channel, and then read out of all FIFOs at a common multiplexing clock. The desired synchronization function is therefore achieved between the channels.

To avoid corruption or contamination of data, one CPLD 76 examines data prior to its entry to FIFO 70. If a packet start character is seen, data is allowed to enter FIFO 70. Data continues to enter FIFO 70 until a packet end character is detected. The presence of packet start and end characters must be guaranteed for this scheme to work, but this is not a difficult requirement, as all packet-based data link protocols must provide such characters to the physical layer of the network. If no valid packet is seen, then no information is put into FIFO 70 and it remains empty.

At the output of the FIFO 70, another CPLD 76 will start accepting data several clock cycles after observing the 'not-empty' flag of FIFO 70 become true. Upon the 'empty' flag being asserted, CPLD 76 will stop accepting data from FIFO 70. In between these periods, packet data flows out of FIFO 70 at the synchronized multiplexed clock rate. Outside these periods, CPLD 76 issues link-specific characters at the synchronous multiplexed rate. These characters are under the control of the link designer, since they can be removed on the receive side of the link. These characters can be used to uniquely identify one or more channels of the multiplexed stream, thereby providing a means to differentiate the streams at the output. Data output from CPLD 76 is sent to anther SERDES 72 and is then output to the MUX.

Figure 5:
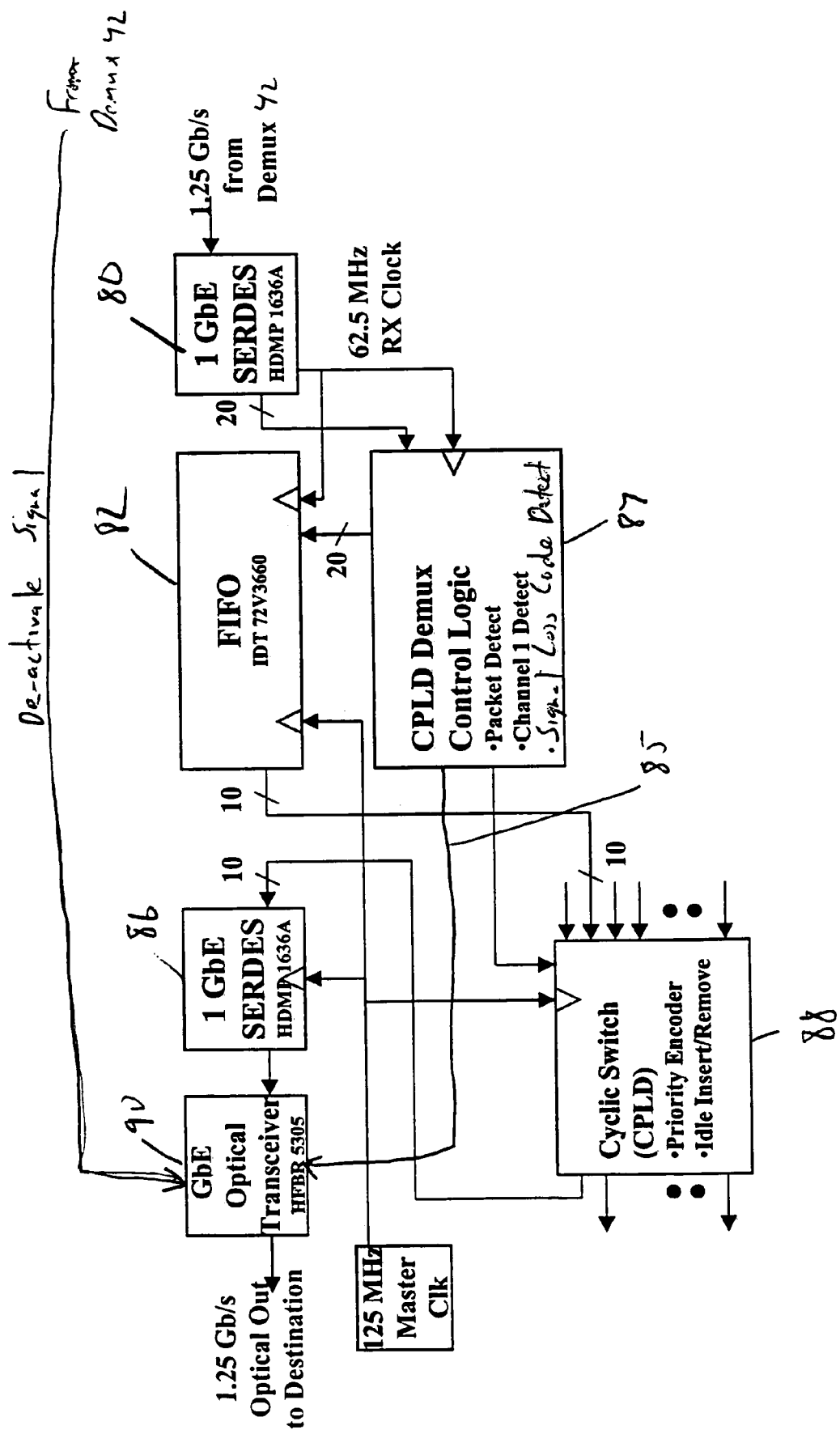
FIG. 5 is a detailed block diagram for one input line of the DEMUX interface of FIG. 3 in accordance with one embodiment of the present invention.

FIG. 5 is a detailed block diagram for one input line of DEMUX interface 40 of FIG. 3 in accordance with one embodiment of the present invention. In FIG. 5, data from the DEMUX is received by a SERDES 80. After that, the same operations of MUX interface 30 described in FIG. 4 are performed in reverse by a FIFO 82, a CPLD 84, a SERDES 86, and an optical transceiver 90. In addition, a Cyclic Switch 88 performs the CPLD functions of searching for the identifying bit-stream characters and using the information to control a cyclic permutation switch that will perform the output stream ordering.

The devices described in FIGS. 4 and 5 solve the bit-synchronization and bit-stream identification problems of a multiplexed data link within the physical layer of the data link.

Propagation and Detection of Fiber Faults

There are at least three possible fiber faults that may occur in the high speed multiplexing system of the present invention such as the embodiment of FIG. 2. One possible fault is a break in one of the 1.25 Gb/s transmit fibers (e.g., the fiber coupling user 51 to MUX interface 30). Another possible fault is a break in the 10 Gb/s fiber-optic link 16. Finally, another possible fault is a break in one of the 1.25 Gb/s receive fibers (e.g., the fiber coupling DEMUX interface 40 to user 60).

In one embodiment of the present invention, a break in one of the 1.25 Gb/s transmit fibers, leading to the loss of signal, is communicated to the corresponding receiving node by MUX 32. Referring to FIG. 4, in one embodiment the loss of signal is detected by optical transceiver 79 and is transmitted to CPLDs 76 through a signal detection line 75. In response, CPLDs 76 generate a "signal loss" code insert. Such an insert would never have been generated by the 8b/10b encoding of valid data in prior art systems. The generated code inserts are bit-multiplexed and transmitted by MUX 32. The signal loss code insert will be transmitted continuously by 76 as long as the loss of signal is detected by 79. Since there is no data being transmitted, it is possible to continuously transmit the signal code.

On the receive side, referring to FIG. 5, the signal loss code is detected by CPLD 84 and transmitted to optical transceiver 90 on line 85. The receipt of a signal loss code forces optical transceiver 90 to respond by, for example, to transmit no light or generate an appropriate code.

In one embodiment of the present invention, a break in the 10 Gb/s fiber-optic link 16 is detected by a photo-detector circuit (not shown) placed before the signal enters DEMUX 42 of FIG. 2. Referring to FIG. 5, the break generates a "deactivate" signal that is transmitted to each and every optical transceiver 90. This causes signal loss on all the 1.25 Gb/s receive links.

In one embodiment of the present invention, a break in one of the 1.25 Gb/s receive fibers is automatically detected by its associated transceiver, causing its PHY chip to detect loss of signal and go into an auto-negotiation stage. MUX 32 does not have to perform any special corrective action for this case.

As described, one embodiment of the present invention is a TDM multiplexer that can multiplex multiple (roughly 8-10) Gigabit Ethernet ports from the same or different Gigabit Ethernet Switches onto a single high-speed fiber-optic link with a line rate on the order of 10 Gb/s. Interfaces to the multiplexer are fully compliant with the Gigabit Ethernet standard, so that the multiplexer is fully transparent to individual Gigabit Ethernet links. Fiber faults are propagated and detected by the TDM multiplexer.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, one or more embodiments have been described in terms of multiplexing Gigabit Ethernet packets. These embodiments make extensive use of the physical layer signaling standards provided in the IEEE 802.3 standard. This implementation enhances the practicality and lowers the cost of the resulting high speed fiber optic link. However, the methods and systems in accordance with the present invention should not be limited to Gigabit Ethernet packets, or to any other known or future data communication standards.

What is claimed is:

1. A data transmission system comprising:
   a first plurality of Gigabit Ethernet input/output ports, each port being adapted to be coupled to a first Gigabit Ethernet link carrying data packets;
   a multiplexer interface coupled to said first input/output ports, said multiplexer interface being adapted to receive said data packets;
   a multiplexer coupled to said multiplexer interface, said multiplexer being adapted to receive said data packets from said multiplexer interface and to multiplex said data packets;
   a transmitter coupled to said multiplexer; and
   an optical link coupled to said transmitter, said transmitter being adapted to transmit the multiplexed data packets over said optical link to a receiver;
   wherein said multiplexer interface comprises a first optical transceiver adapted to detect a first loss of signal in at least one of said first Gigabit Ethernet links; to generate a signal loss code insert in response to detection of said first loss of signal; and to apply said signal loss code insert to said multiplexer in place of said data packets from said at least one of said first Gigabit Ethernet links having said first loss of signal;
   said receiver, which is coupled to said optical link and is adapted to receive said multiplexed data packets from said optical link;
   a demultiplexer coupled to said receiver, said demultiplexer being adapted to demultiplex the received multiplexed data packets; and
   a demultiplexer interface coupled to said demultiplexer, said demultiplexer interface being adapted to receive the demultiplexed data packets,
   wherein said demultiplexer interface comprises a plurality of second optical transceivers that are each adapted to be coupled to a plurality of second Gigabit Ethernet links;
   and wherein said demultiplexer interface is adapted to prevent at least one of said second optical transceivers from transmitting light in response to receipt of said signal loss code insert within the demultiplexed data packets;
   wherein each of said second optical transceivers comprises a physical layer chip,
   adapted to detect a third loss of signal in one of said second Gigabit Ethernet links and go into an auto-negotiation stage.

2. A method of communicating the existence of faults in a data transmission system, said method comprising:
   receiving a plurality of data packets carried on a plurality of first Gigabit Ethernet links at a first plurality of Gigabit Ethernet input/output ports;
   multiplexing said data packets;
   transmitting the multiplexed data packets to a receiver along at least a portion of an optical link;
   detecting a first loss of signal in at least one of said first Gigabit Ethernet links and generating a signal loss code insert in response to detecting said first loss of signal; and
   transmitting said signal loss code insert to said receiver in place of said packets from said at least one of said first Gigabit Ethernet links having said first loss of signal;
   wherein each of said second optical transceivers comprises a physical layer chip,
   said method further comprising said physical layer chip detecting a third loss of signal in one of said second Gigabit Ethernet links; and
   entering into an auto-negotiation stage.

* * * * *